United States Patent
Schneider et al.

(10) Patent No.: US 10,956,132 B1
(45) Date of Patent: Mar. 23, 2021

(54) UNIFIED CODE AND DATA MANAGEMENT FOR MODEL DEVELOPMENT

(71) Applicant: Amazon Technologies, Inc., Seattle, WA (US)

(72) Inventors: Donald Erik Schneider, Kirkland, WA (US); David Said Martinez, Seattle, WA (US); Ryan Thomas, Seattle, WA (US); Alex Guazzelli, San Diego, CA (US); Fletcher Liverance, Oakland, CA (US); Stephanie Moyerman, Phoenix, AZ (US); Ramesh Sekaran, Sammamish, WA (US); John Sitar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/005,372

(22) Filed: Jun. 11, 2018

(51) Int. Cl.
  *G06F 8/40* (2018.01)
  *G06N 20/00* (2019.01)
  *G06N 5/04* (2006.01)

(52) U.S. Cl.
  CPC ............... *G06F 8/40* (2013.01); *G06N 5/046* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 8,892,947 B1 | 11/2014 | Chopra et al. | |
| 9,053,210 B2 | 6/2015 | Elnikety et al. | |
| 9,529,630 B1 | 12/2016 | Fakhouri et al. | |
| 9,665,463 B2 | 5/2017 | Anderson et al. | |
| 10,262,271 B1 * | 4/2019 | Doddi | G06N 5/041 |
| 2011/0060704 A1 * | 3/2011 | Rubin | G06N 20/00 706/12 |
| 2015/0379429 A1 * | 12/2015 | Lee | G09B 5/00 706/11 |
| 2015/0379430 A1 * | 12/2015 | Dirac | G06N 20/00 706/12 |
| 2016/0034530 A1 * | 2/2016 | Nguyen | G06F 16/2471 707/719 |
| 2016/0078361 A1 * | 3/2016 | Brueckner | H04L 67/10 706/12 |

(Continued)

OTHER PUBLICATIONS

"The 7 Steps of Machine Learning Towards Data Science", internet blog, Yufeng G (Year: 2017).*

(Continued)

*Primary Examiner* — Daxin Wu
(74) *Attorney, Agent, or Firm* — Kowert, Hood, Munyon, Rankin & Goetzel, P.C.; Robert Kowert

(57) ABSTRACT

Methods, systems, and computer-readable media for unified code and data management for machine learning models are disclosed. A plurality of dependency graphs, including a first dependency graph and a second dependency graph, are generated. The graphs comprise nodes associated with a software development model or machine learning model, and the nodes represent transforms. One or more transforms of the first dependency graph are used to generate first output corresponding to a node in the second dependency graph. One or more transforms of the second dependency graph are used to generate second output based at least in part on the first output.

20 Claims, 8 Drawing Sheets

(56) References Cited

U.S. PATENT DOCUMENTS

| | | | |
|---|---|---|---|
| 2017/0132513 A1* | 5/2017 | Yu | G06N 3/08 |
| 2018/0175790 A1* | 6/2018 | Sanfilippo | H02J 3/383 |
| 2018/0232211 A1* | 8/2018 | Maurya | G06F 8/33 |
| 2018/0275967 A1* | 9/2018 | Mohamed | G06N 3/08 |
| 2019/0005407 A1* | 1/2019 | Harris | G06N 3/088 |
| 2019/0286973 A1* | 9/2019 | Kovvuri | G06N 3/04 |

OTHER PUBLICATIONS

Google Cloud Platform, "Deploying a Pipeline," Google, Jul. 2017, Retrieved from: https://cloud.google.com/dataflow/service/dataflow-service-desc, pp. 1-11.

Beisken, S. et al "KNIME-CDK: Workflow-driven Cheminformatics." BMC Bioinformatics. 14:257, Aug. 2013.

Warr, Wendy, "Scientific workflow systems: Pipeline Pilot and KNIME," Journal of Computer-Aided Molecular Design, vol. 26, pp. 801-804, May 2012.

"Red Hat JBoss Enterprise Application Platform 7.1: Introduction to JBoss EAP," redhat.com, Apr. 2018.

U.S. Appl. No. 15/717,587, filed Sep. 27, 2017, Fletcher Liverance et al.

* cited by examiner

UNIFIED CODE AND DATA MANAGEMENT FOR MODEL DEVELOPMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many services that interact with one another in varied ways.

Figure 1:
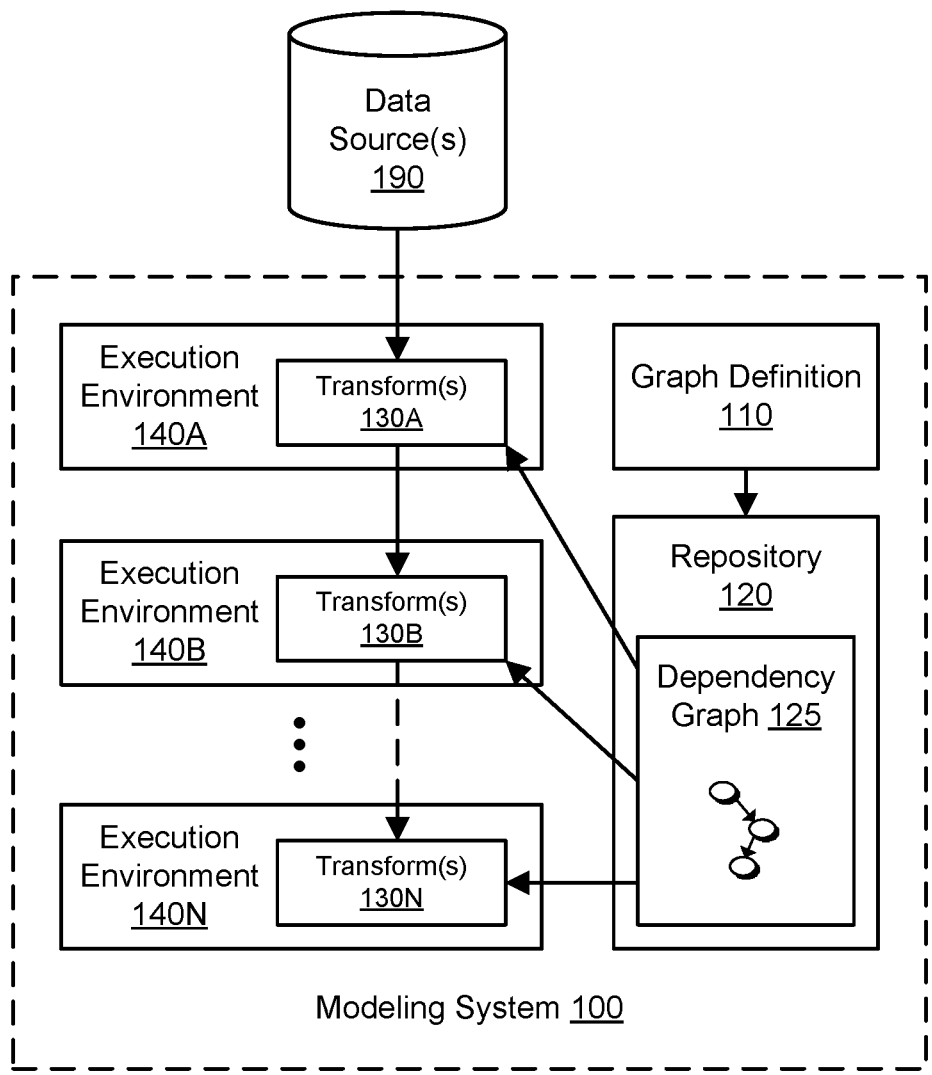
FIG. 1 illustrates an example system environment for unified code and data management for machine learning models or software development models, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for unified code and data management for machine learning models or software development models are described. Using the techniques described herein, a machine learning lifecycle may be simplified by using a consistent paradigm to implement various stages of the lifecycle. One or more dependency graphs for a machine learning model or software development model may include nodes for various stages of the model. For example, a first graph may include nodes for training the model, a second graph may include nodes for testing the trained model, and a third graph may include nodes for application of the tested model in a production environment to output inferences. Each node may represent a transform that consumes a stream of data and generates another stream. A graph itself may represent a transform. The output of a graph may represent a node in another graph. The transforms may be deployed to various hosts, and streams of data may be routed between transforms based on the dependency graphs. A transform may comprise a set of program code and parameters. A dependency graph or its constituent transforms may be stored, retrieved, modified, and/or re-used. For example, another version of a model may be trained using the same input data and the same training transform(s) but with different parameters for the transform. Transforms may be selected by developers from a catalog. A stream may be identified using the identifier of the transform that produces the stream plus the identifier(s) of the transform(s) and/or data sources that are consumed to produce the stream. A stream may be associated with a version identifier, and the version may be changed when the transform that produces the stream is modified. Consumers of the stream may validate the contents of the stream upon determining that the version has changed. Costs may be attributed to consumers of streams based on the version identifiers of the streams. By implementing various stages of the machine learning or software development lifecycle as transforms with dependencies on other transforms, development of machine learning or software development tools may be simplified and empowered.

As one skilled in the art will appreciate in light of this disclosure, embodiments may be capable of achieving certain technical advantages, including some or all of the following: (1) improving the accuracy of machine learning or software development processes by permitting stages of the machine learning lifecycle to be tracked consistently and reproduced easily; (2) improving the simplicity and speed of developing machine learning tools or other software tools and thus reducing use of computing resources; (3) improving the simplicity and speed of developing machine learning tools or other software tools and thus reducing developers' time; (4) improving auditability of machine learning tools or other software tools; (5) improving reproducibility of machine learning tools or other software tools; (6) using computing resources more efficiently by leveraging idle resources of a distributed system to host various transforms; (7) using computing resources more efficiently by applying a constraint solver to optimize deployment of transforms of a dependency graph; and so on.

In one embodiment, the modeling techniques described herein may be used for management of machine learning models, as well as program code and data for software development, in a consistent manner with a unified paradigm. In one embodiment, the modeling techniques described herein may be used to permit different teams of developers to collaborate with ease, such that independent components that are consistent with the unified paradigm may be leveraged by and shared among different developers. In one embodiment, the modeling techniques described herein may empower data democratization by opening up enterprise data for broad reusability while respecting the boundaries of privacy and security. In one embodiment, the modeling techniques described herein may provide introspection by tracing the provenance of datasets to gain an understanding of how data was computed. In one embodiment, the modeling techniques described herein may address the problem of entanglement of data sources. In one embodiment, the modeling techniques described herein may address the problem of undeclared consumers of machine learning data. In one embodiment, the modeling techniques described herein may provide protection from unstable data dependencies, such as input signals that change over time. In one embodiment, the modeling techniques described herein may reduce or eliminate "glue code" responsible for getting data into and out of general-purpose systems and tending to freeze a system to the peculiarities of a specific version of code. In one embodiment, the modeling techniques described herein may address the problem of pipeline jungles with pipeline nodes that are complex and difficult to manage.

FIG. 1 illustrates an example system environment for unified code and data management for machine learning models or software development models, according to one embodiment. A modeling system 100 may manage and deploy transforms that can be run to perform a variety of machine learning or software development tasks. The transforms may be chained together such that the output of one transform is the input for another transform. As shown in the example of FIG. 1, the transforms may include one or more transforms 130A that perform a first stage of processing using input data from one or more data sources 190, one or more transforms 130B that perform a second stage of processing based on data provided by the transform(s) 130A, and one or more transforms 130N that perform an Nth stage of processing based on data provided by one or more upstream transform(s). In various embodiments, the transform(s) 130B may provide data to transform(s) 130N either directly (without any intermediate transforms) or indirectly (through one or more intermediate transforms). In various embodiments, any of the transforms may also consume data from a data source or repository as well as code or data produced by another transform. Although transforms 130A-130N are shown for purposes of illustration and example, it is contemplated that the system 100 may include any suitable number and configuration of transforms. Data sources 190 may include database systems, data stores, tables, repositories, storage services, sources of streaming data, memory locations, and so on.

The dependency relationships between the transforms may be captured in a dependency graph 125 stored in a suitable repository 120. The graph 125 may represent a directed acyclic graph or other type of graph in which nodes represent transforms and edges represent the flow of data from transform to transform. In one embodiment, the graph may be defined using a component for graph definition 110. In one embodiment, the graph definition 110 may define the nodes and edges of the graph based (at least in part) on user input, e.g., from a developer who seeks to build a machine learning tool. In one embodiment, the repository 120 may include or be associated with an interface that permits users to browse a catalog of transforms, select transforms from the catalog, and include the selected transforms in a machine learning tool or other software tool. In one embodiment, the graph 125 may be built based (at least in part) on automated analysis of transforms selected by a user, e.g., such that a transform that expects output from a particular stream is automatically given a dependency relationship on a transform that outputs such data. The repository 120 and catalog may be enabled by a transform dictionary that defines metadata for transforms, including descriptive information as well as the code to execute the transform or a reference to the location of the code.

A machine learning model may be associated with three stages or phases: a training phase where the model is trained, a testing phase where the model is tested, and an inference phase where the model is applied to live data. In one embodiment, any of these stages may be captured using transforms. A transform may represent a computation engine that transforms a dataset from one representation to another. Using the example system 100 shown in FIG. 1, a federation of transforms may be created, organized, and managed. Each transform may produce a dataset, typically from another dataset (or multiple datasets) that it consumes. In one embodiment, transforms may be operated in a Hosted Transformer Environment (HTE), each of which may implement a common application programming interface (API). The common API may allow flexible configuration and composable interaction within and outside of process boundaries. The common API may permit teams of developers to flexibly share data and computation; even if the data remains local, this decomposition may facilitate incremental testing of components of a complicated computation.

Figure 7:
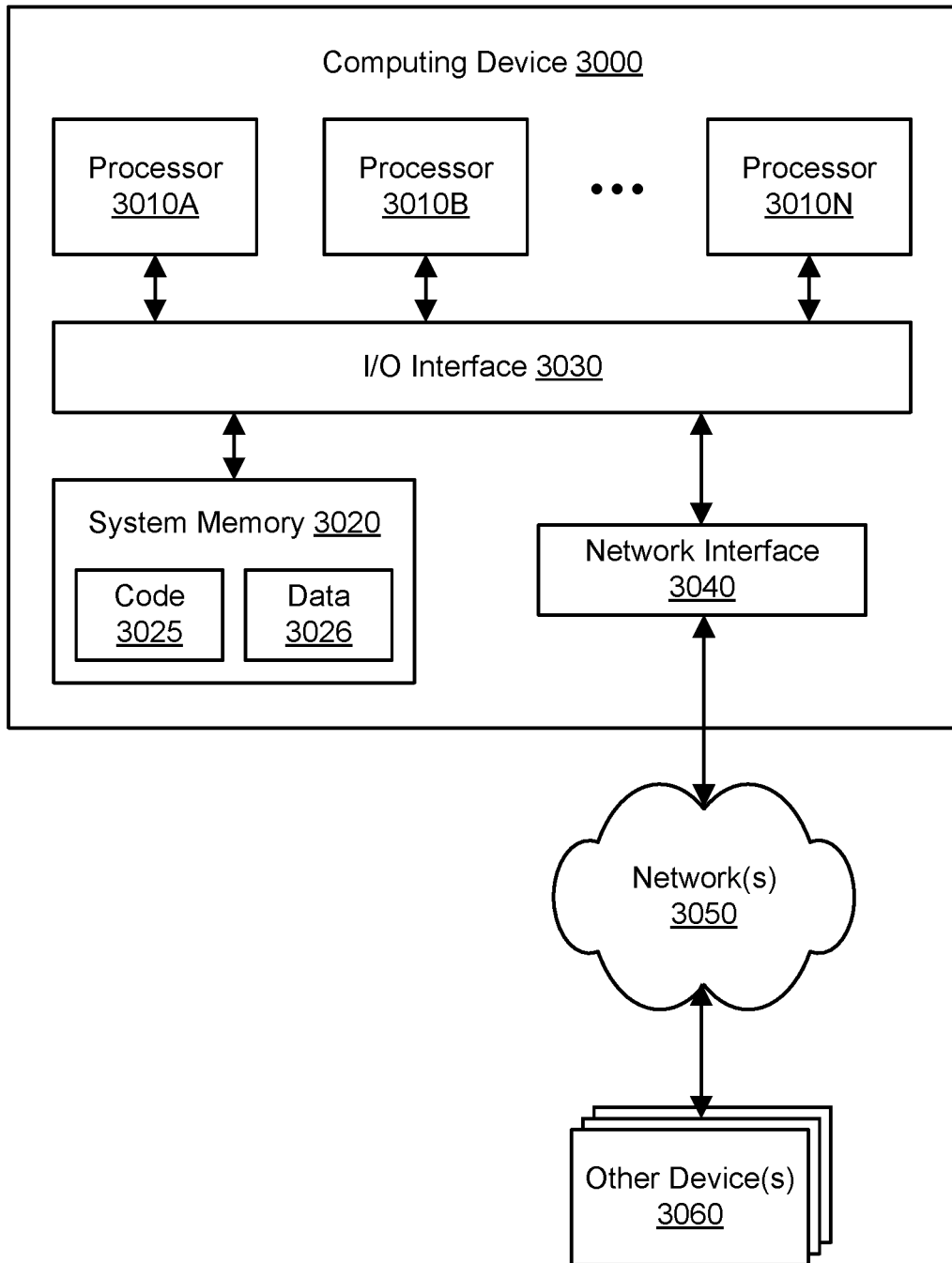
FIG. 7 illustrates an example computing device that may be used in some embodiments.

In various embodiments, the execution environments 130A, 130B, and 130N may represent one or more HTEs. Each HTE may include one or more hosts or servers that execute the program code of the corresponding transforms. An execution environment may include or be associated with one or more systems, services, or other components that implement tasks associated with a transform. Any of the systems, services, or other components of an execution environment may be built on one or more computing devices such as the example computing device 3000 as illustrated in FIG. 7. The execution environments may vary in terms of their underlying configurations. In one embodiment, the execution environments may include MapReduce-based cluster computing environments, stream processing systems, workflow systems such as Amazon Simple Workflow Service, and other suitable environments. In one embodiment, an execution environment may be implemented using a cluster of computing devices that cooperate to execute transforms. A cluster may be provisioned, launched, or otherwise spun up in order to perform one or more transformations associated with a transformation specification. In one embodiment, a particular execution environment may use an orchestration framework such as Apache Hadoop, Apache Spark, and so on to manage a cluster. In one embodiment, a particular execution environment may register the types of operations it can perform or other characteristics with a deployment engine of the system 100 so that appropriate execution environments may be automatically selected for transforms.

The system 100 may be implemented using any suitable number and configuration of computing devices, any of which may be implemented by the example computing device 3000 illustrated in FIG. 7. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

The transforms 130A-130N may be implemented in a service-oriented system in which multiple services (e.g., services in the execution environments 140A-140N) collaborate according to a service-oriented architecture. In such an environment, the repository 120 and/or transforms may offer their functionality as a service to multiple clients. To enable clients to invoke their functionality, the repository and/or transforms may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of a transform may be offered to clients in exchange for fees, or the cost associated with running a transform may be assessed to a responsible entity.

Components of the system 100 may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100 may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 2:
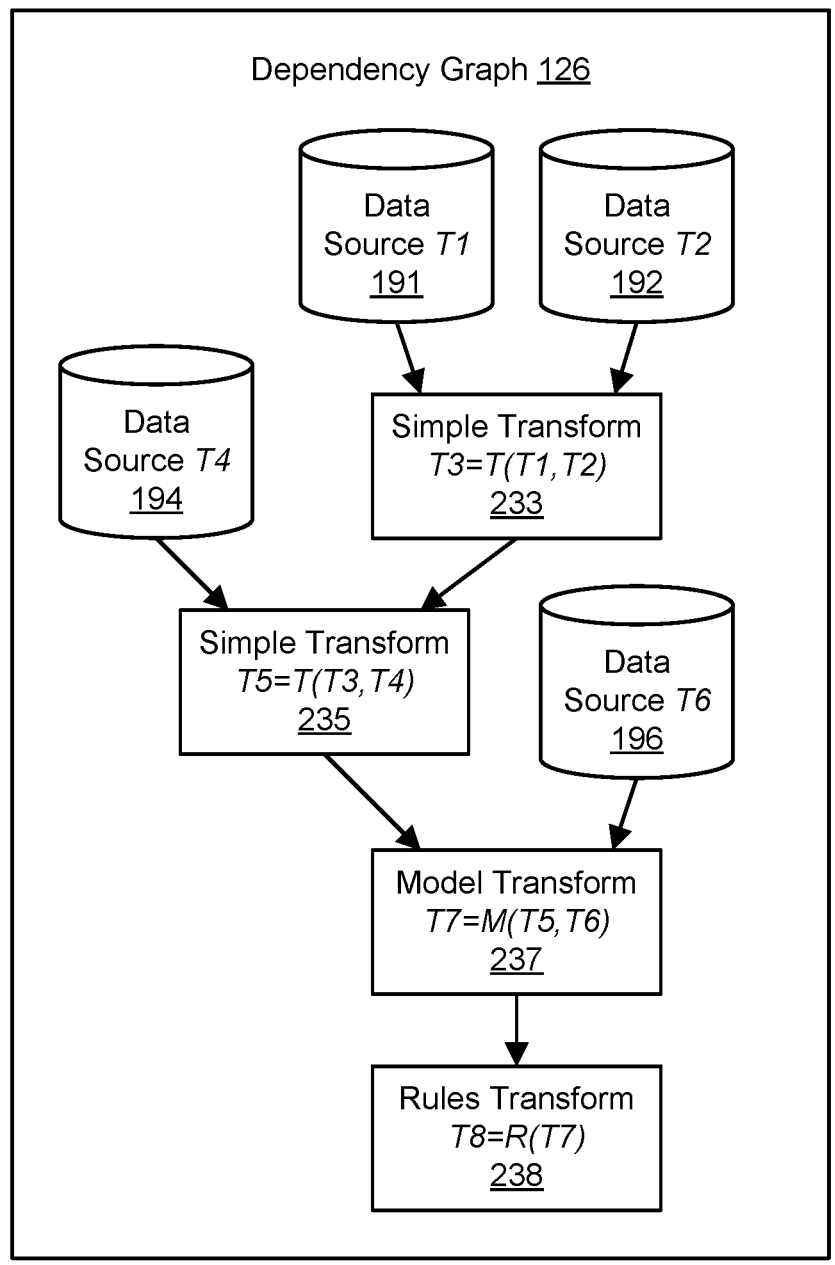
FIG. 2 illustrates further aspects of the example system environment for unified code and data management for machine learning models or software development models, including an example of a dependency graph indicating relationships between transforms, according to one embodiment.

FIG. 2 illustrates further aspects of the example system environment for unified code and data management for machine learning models or software development models, including an example of a dependency graph indicating relationships between transforms, according to one embodiment. A transform may be implemented using a bundle of program code (e.g., a package) configured with parameterized values. A transform may process a data record by decorating the record with additional data and/or removing existing data. A transform may be deployed to a Hosted Transformer Environment (HTE) that implements the transform API to allow federation of such transforms. A transform implementation may include two elements: the transform code that is used to apply the transform, and the parameters that are supplied to guide that transformation. A dependency graph such as graph 126 may include nodes that correspond to these transform implementations along with semantics that describe the meaning of data streams between nodes. Graph 126 may itself represent a transform, and accordingly graph 126 may be included as a node in another dependency graph. For example, graph 126 may produce output (e.g., a machine-learning model or program code at a particular stage of software development) that is consumed by another transform in another dependency graph.

A machine learning model may be associated with a collection of weights trained against a corpus of data, which has "learned" how to apply those weights to classify or interpret a new sample of data. A transform that implements such tasks may be termed a model transform. A model transform may be created through an automated process (e.g., "training") but may also be constructed by hand in a number of ways, such as by directly implementing code, by computing and manually entering parameterization, and so on. As shown in the example dependency graph 126 of FIG. 2, a model transform 237 may perform such operations. Models are typically accompanied by a ruleset that interprets the model scores. A ruleset may consume a vector of features and produce a new vector (often a small one, e.g., containing only a single entry). A ruleset may be termed a rules transform. As shown in the example of FIG. 2, a rules transform 238 may apply a ruleset to a model produced by model transform 237.

In one embodiment, a raw data transform (or data transform) may represent a special case of a transform which supplies data from authoritative data storage. The raw data storage may have no input (other than its storage) and may produce raw data; that is, the transform may gather and emit the fundamental information that represents a state of the world. For example, data sources 191, 192, 194, and 196 may be represented in the graph 126 by data transforms. In one embodiment, a simple transform or basic transform may represent a more typical transform that consumes input data (but is not a model transform or rule transform). The example graph 126 may include simple transforms 233 and 235. For example, a simple transform or basic transform may compute a sum, compute a histogram, or perform a low-pass filter. In one embodiment, a pipeline transform may orchestrate a cascading transformation by invoking a collection of transforms, where the relationship between the transforms is typically described by a directed acyclic graph or other type of graph. In one embodiment, if every transform and HTE implements a common interaction API, a pipeline transform engine may be able to invoke any other compliant transform or HTE, including other pipeline transform engines for cascading pipelines.

In one embodiment, to perform inference, transforms may typically be invoked as a pipeline of three or four types of transform: e.g., one or more data transforms to construct a view of the environment, one or more basic transforms to infer computed features, one or more model transforms to add scoring, and one or more rule transforms to classify the results into a more useful form. In one embodiment, the dependency graph 126 may represent a set of transforms that collaborate to perform inference. In various embodiments, these transforms may be local to a single HTE or may be implemented as a federation of HTEs. The results (e.g., inferences) of such a pipeline may typically be published to another system that will use the results to enact some form of impact on the environment. Using prior approaches for machine learning models or software development models, systems that gather and prepare data have been distinct from systems that host and operate models. Using the system 100, the inference engine may be implemented instead as a pipeline transform that creates opportunities for powerful interoperability.

Data may arrive at the modeling system 100 at a boundary termed the request horizon. At the request horizon, raw data (e.g., from one or more data sources 190) may arrive as a torrent of events; each of these events may carry information that can be used to create or mutate data records. Across an enterprise, a river of such data may include a set of individual data channels, with each channel containing changes focused on a class of related entities. For example, in an enterprise that offers an online marketplace of goods and services, offers may represent one channel; orders may represent another channel, and changes to seller identity information may represent yet another channel. Each channel may include of a flow of individual records representing a collection of variables (or features), manifesting the changes to specific fields of an individual entity in the channel. Channels may be logically aggregated together into streams of changes to collections of entities of interest. In one embodiment, a channel may be mixed into multiple streams. In one embodiment, a channel may represent the output of a transform, and a stream may represent the collection of one or more channels that a transformer consumes. Because the same underlying data may represent a channel to one transform and a stream to another transform, the terms "channel" and "stream" may also be used interchangeably. In one embodiment, each channel and each stream may be formally identified and defined in an immutable manner. In one embodiment, the channels themselves may also be versioned. In one embodiment, if the semantics of any variable within the channel changes, then a new version of the channel may be created. The semantics may be maintained in association with the dependency graphs.

In one embodiment, at any given time, the "head" of the collection of data channels may represent a collection of the most recent changes in every channel. This collection may be termed the head vector, for both the collection of channels and for each stream within it. A time-slice may represent a slice across the collection of channels at any historical time, and a data slice or feature vector may represent the vector of data immediately preceding the time-slice. In one embodiment, a time range may include the data between a pair of time-slices. Any such ranged subset of a stream may be termed a dataset, and each such dataset may have its own head vector (or feature vector). In one embodiment, to ensure that record ordering is consistent across disparate entities and storage services, data transformers may coordinate their clocks using a time synchronization service and use those clocks to timestamp their data.

In one embodiment, each transform (such as transforms 233, 235, 237, and 238) may consume a source data stream and produce a derived data channel, except for raw data transforms (represented in graph 126 by data sources 191, 192, 194, and 196) which have no input and produce a raw data channel. In one embodiment, no transform may change any variables in its source stream; a transform may only add new variables to the input stream and/or filter variables out of the input stream to create the channel which can be mixed into other streams. In one embodiment, each derived channel exists retroactively and can immediately be added to historical datasets. In one embodiment, a transform and/or the stream that it produces may be defined and identified based (at least in part) on the streams that it consumes. For example, the transform 233 may be defined as T3=T(T1,T2), where T1 represents data source 191 and T2 represents data source 192. Similarly, the transform 235 may be defined as T5=T(T3,T4), where T3 represents transform 233 and T4 represents data source 194. As another example, transform 237 may be defined as T7=M(T5,T6), where T5 represents transform 235 and T6 represents data source 196. As yet another example, transform 237 may be defined as T8=R(T7), where T7 represents transform 237. Semantic data may describe the output of a transform. For example, the graph 126 may describe the meaning of the output of transform 233.

Figure 3A:
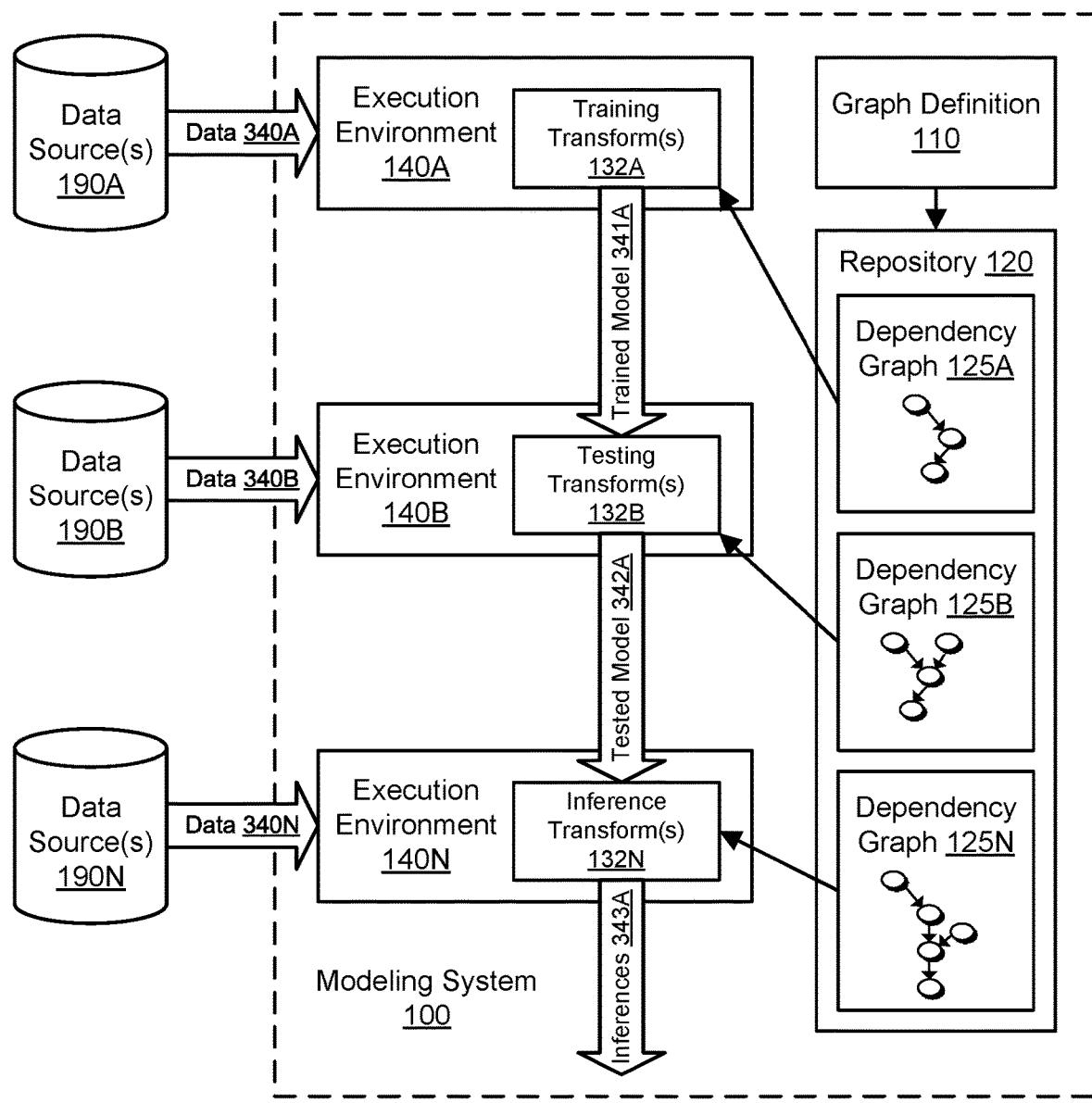
FIG. 3A illustrates further aspects of the example system environment for unified code and data management for machine learning models or software development models, including the use of transforms to perform training, testing, and inference, according to one embodiment.

FIG. 3A illustrates further aspects of the example system environment for unified code and data management for machine learning models or software development models, including the use of transforms to perform training, testing, and inference, according to one embodiment. As discussed above, a machine learning model may be associated with three stages or phases: a training phase where the model is trained, a testing phase where the model is tested, and an inference phase where the model is applied to live data. In one embodiment, any of these stages may be captured using transforms. In the example machine learning model shown in FIG. 3A, a dependency graph 125A may indicate the relationships among a set of training transforms 132A. One or more training transforms 132A may consume data 340A from the one or more data sources 190A. The data 340A may represent raw data and may be introduced to the system 100 by one or more data transforms (not shown). Using the data 340A, the training transform(s) 132A may generate a trained model 341A. The training transform(s) 132A may output the trained model 341A using one or more channels, and the channels may represent a stream of input to one or more testing transform(s) 132B.

A dependency graph 125B may indicate the relationships among a set of testing transforms 132B. One or more testing transforms 132B may consume data 340B from the one or more data sources 190B. The data 340B may represent raw data and may be introduced to the system 100 by one or more data transforms (not shown). Using the data 340B and the trained model 341A, the testing transform(s) 132B may generate a tested model 342A. The testing transform(s) 132B may output the tested model 342A using one or more channels, and the channels may represent a stream of input to one or more inference transform(s) 132N.

A dependency graph 125N may indicate the relationships among a set of inference transforms 132B. One or more inference transforms 132N may consume data 340N from the one or more data sources 190N. The data 340N may represent raw data and may be introduced to the system 100 by one or more data transforms (not shown). Using the data 340N, the inference transform(s) 132N may apply the model 342A in a production environment to generate inferences 343A. The inferences may represent predictions of future behavior.

Figure 3B:
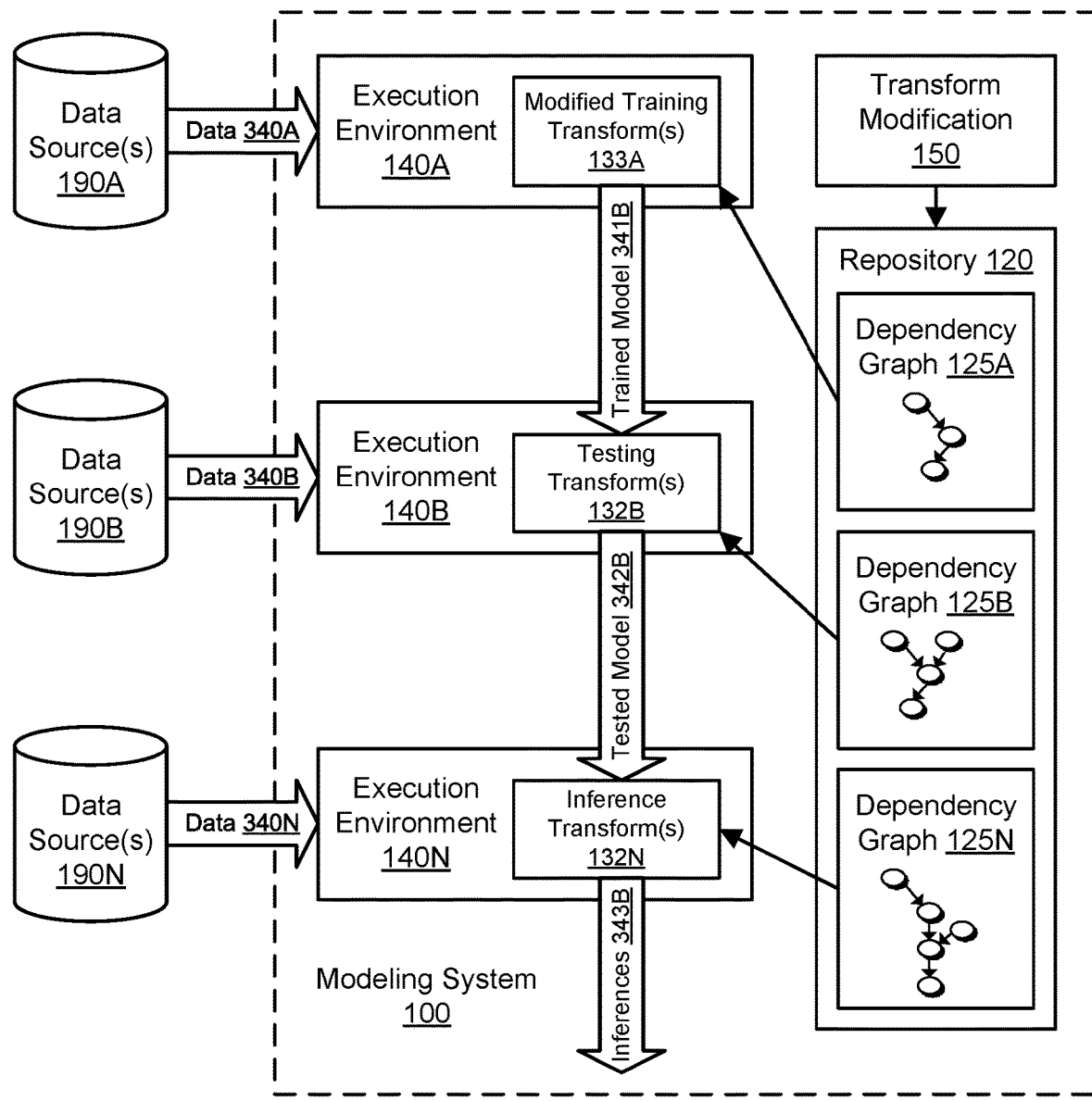
FIG. 3B illustrates further aspects of the example system environment for unified code and data management for machine learning models or software development models, including the use of a modified transform to perform training, testing, and inference using the same raw data as an earlier model, according to one embodiment.

FIG. 3B illustrates further aspects of the example system environment for unified code and data management for machine learning models or software development models, including the use of modified transforms to perform training, testing, and inference using the same raw data as an earlier model, according to one embodiment. In one embodiment, by unifying the management of both code and data using transforms having dependency relationships, source data may be reused for additional models and not discarded. Using a component for transform modification 150, the program code and/or parameters of the training transform(s) 132A may be modified to produce one or more modified training transform(s) 133A. The modified training transform(s) 133A may replace the prior version 132A in the repository 120 and in the dependency graph 125A. When the modified training transform(s) 133A are deployed and run, the transform(s) may reuse the same data source(s) as the earlier version 132A. In one embodiment, the actual data elements used by the modified training transform(s) 133A may be identical to the data elements used by the prior version 132A. As discussed with respect to FIG. 3A, the modified training transform(s) 133A may produce a trained model 341B, the same testing transform(s) 132B may take that trained model and produce a tested model 342B, and the same inference transform(s) may take that tested model and produce inferences 343B. By using the modified training transform(s) with the same components as the original training transform(s), and automatically deploying and running the various transforms based on the dependency graphs 125A-125N, the same input data 340A may be used to produce different inferences.

Figure 4:
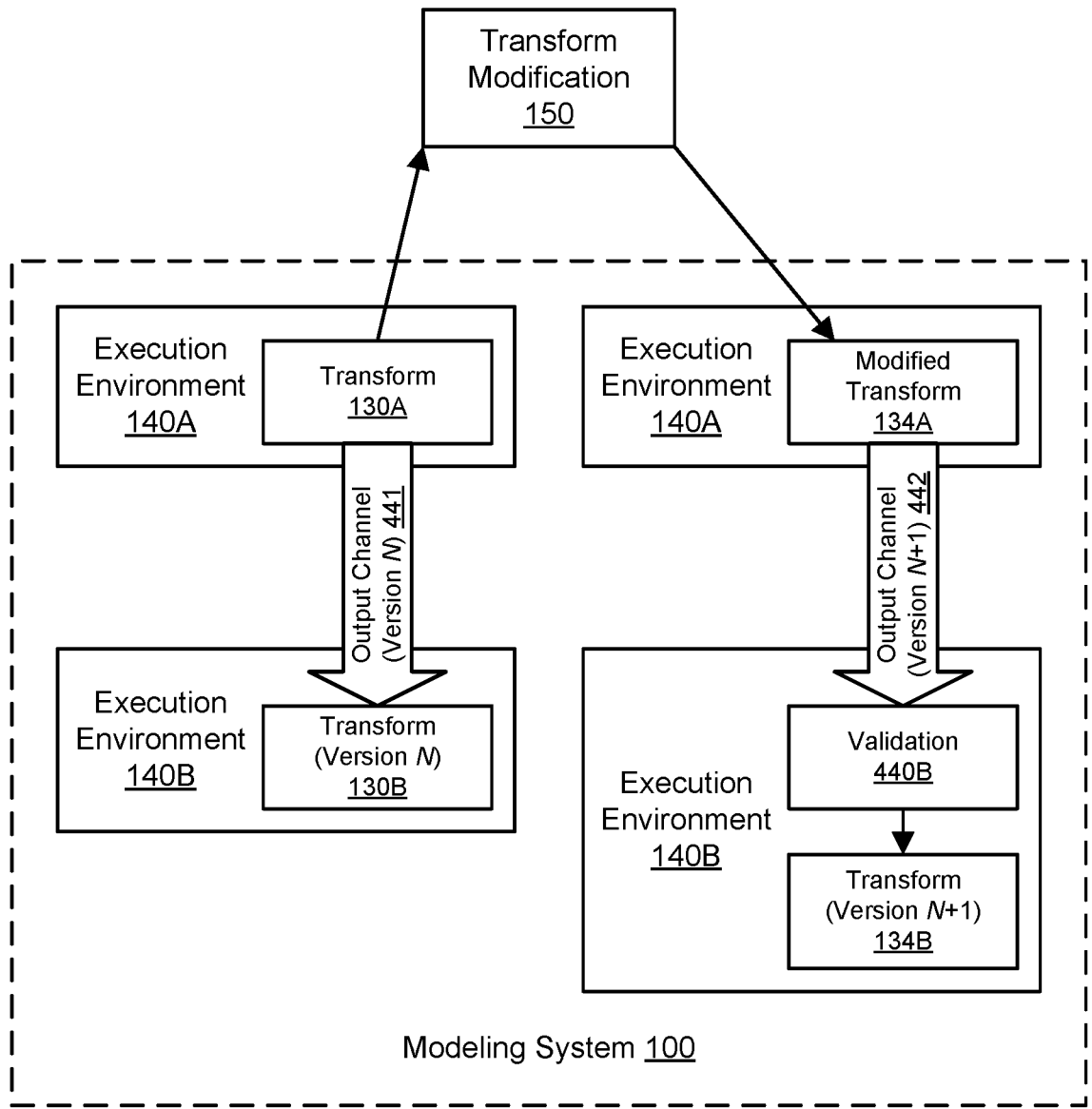
FIG. 4 illustrates further aspects of the example system environment for unified code and data management for machine learning models or software development models, including the use of versioned channels and validation of new versions by downstream transforms, according to one embodiment.

FIG. 4 illustrates further aspects of the example system environment for unified code and data management for machine learning models or software development models, including the use of versioned channels and validation of new versions by downstream transforms, according to one embodiment. In one embodiment, a channel may be versioned. For example, an output channel 441 produced by transform 130A may be associated with a particular version identifier N. In the example of FIG. 4, the transform 130A may undergo transform modification 150 to produce a modified transform 134A, e.g., the transform 130A but with modified program code or modified parameter values. As a result of the modification, the output channel 442 of the modified transform 134A may be associated with a version identifier N+1. On determining that the input from the channel 442 has a different version number than past input, the execution environment 140B may run a validation component 440B associated with the transform 130B. The validation component 440B may analyze the contents of the new version of the channel 442 before the transform itself is run on the input data. In one embodiment, by consuming a new version of the output channel of the upstream transform, a new instance of transform 124B (of version N+1) may be created automatically. In one embodiment, the original transform instances 130A and 130B may be run in parallel with the modified transform instances 134A and 134B, such that both sets of transforms may be available to generate output to consumers. In one embodiment, the original transforms 130A and 130B may be allowed to expire and be removed from the system 100 if all of the consumers of their output channel(s) have switched to newer versions of those output channel(s).

In one embodiment, the semantics of a variable in a raw channel may not change; in general, the distribution of the data within a raw channel may be expected to change only in response to a change in the underlying reality. In one embodiment, because a change to any transform may change the semantics of variables or the distribution of them in the channel it produces, any downstream transform must be able to decide when and how to explicitly shift to consuming the new version of an input stream. In one embodiment, the version of each derived channel may depend on both the version of the transform itself and the version of all the channels it consumes. In one embodiment, such changes may be considered transitive: if an input stream version changes, then any output channel derived from it will likely change as well. In one embodiment, the propagation of changes through the pipeline may be managed by sending change notifications through the data graph as each transform identifies that its output is affected and creates a new version of its output channel. In one embodiment, a transform may be able to automatically test a new version of a source stream to evaluate the impact on its derived output so that it can explicitly manage when and how to migrate to the new version. In one embodiment, the common API for transforms may support input validation, e.g., for analysis of the data distribution of variables within streams and automatic validation as to whether a new version of a source stream has an appreciable impact on any variables added to the derived channel. In one embodiment, downstream consumers may be alerted when new variables are added. In one embodiment, the machine learning modeling system may include facilities to communicate between dependencies, e.g., so that consumers may discover newly added features and producers may notify consumers about changes.

In one embodiment, to facilitate such validation, each version of a channel may be guaranteed to exist until there are no consumers for it. For example, channel (version N) 441 may be maintained until there are no consumers for it, and similarly an output channel produced by transform 130B may be maintained until there are no consumers for it. In one embodiment, even when a channel has been retired, it should be possible to reproduce it, as the channel version includes the specific version of the transform that produced it along with the versions of the source stream it consumes. In one embodiment, as long as the raw data for the model is still available, then the transformation may be reproduced.

In one embodiment, the modeling system 100 may permit testing on historical data and also permit experimentation to evaluate transform behavior with live data. In one embodiment, the modeling system 100 may support NCC (n-Challenger/Champion or "many armed bandit") experimentation as an equivalent to A/B testing, where transforms are given traffic to score proportionate to their yield. In one embodiment, the modeling system 100 may support longitudinal or long-running experimentation on policies that may require population segmentation by identity based on careful analysis to assure that the selected populations are truly random. In one embodiment, transforms may add tags to channels to indicate which path in the graph should be activated for a particular record, and such tags may be used to support various types of experimentation.

In various embodiments, the modeling system 100 may simplify and unify the management and development of transforms using a variety of techniques and assumptions. In one embodiment, to implement unique transform identifiers, every transform can be uniquely identified by the collection of inputs it consumes and the operation it applies to them. For example, given two data channels C1 and C2, and the desire to sum the data elements in C1 and C2, the identifier "C1,C2:sum" may identify the desired transformation. In one embodiment, a given transform may also be versioned, and the fully specified identifier may include a version identifier (e.g., version 27) such as "C1,C2:sum27." In one embodiment, for concision and utility, such a transform identifier may be reduced to a single globally unique ID (GUID) via hashing. In one embodiment, if every channel in the ecosystem is produced by a transform, then the transform ID that produces the channel is sufficient to identify the channel as input to consuming transforms. In one embodiment, a channel identifier may represent a transform ID reinterpreted to refer to its data output. In one embodiment, given a channel ID, a dataset may be fully identified by simply adding time-slices. In one embodiment, a dataset identifier may include a single channel ID and two timestamps denoting the boundaries of the dataset within the channel.

In various embodiments, transforms may operate in different modes with respect to input streams. In one embodiment, a transform may operate in a reactive mode in which it reacts to any record emitted by upstream transforms to produce a transformed record to be added to its output channel. In one embodiment, a transform may operate in batch mode in which it produces the dataset imputed by transforming all the records between two time-slices and collecting the results into a concrete dataset (or file).

Figure 5:
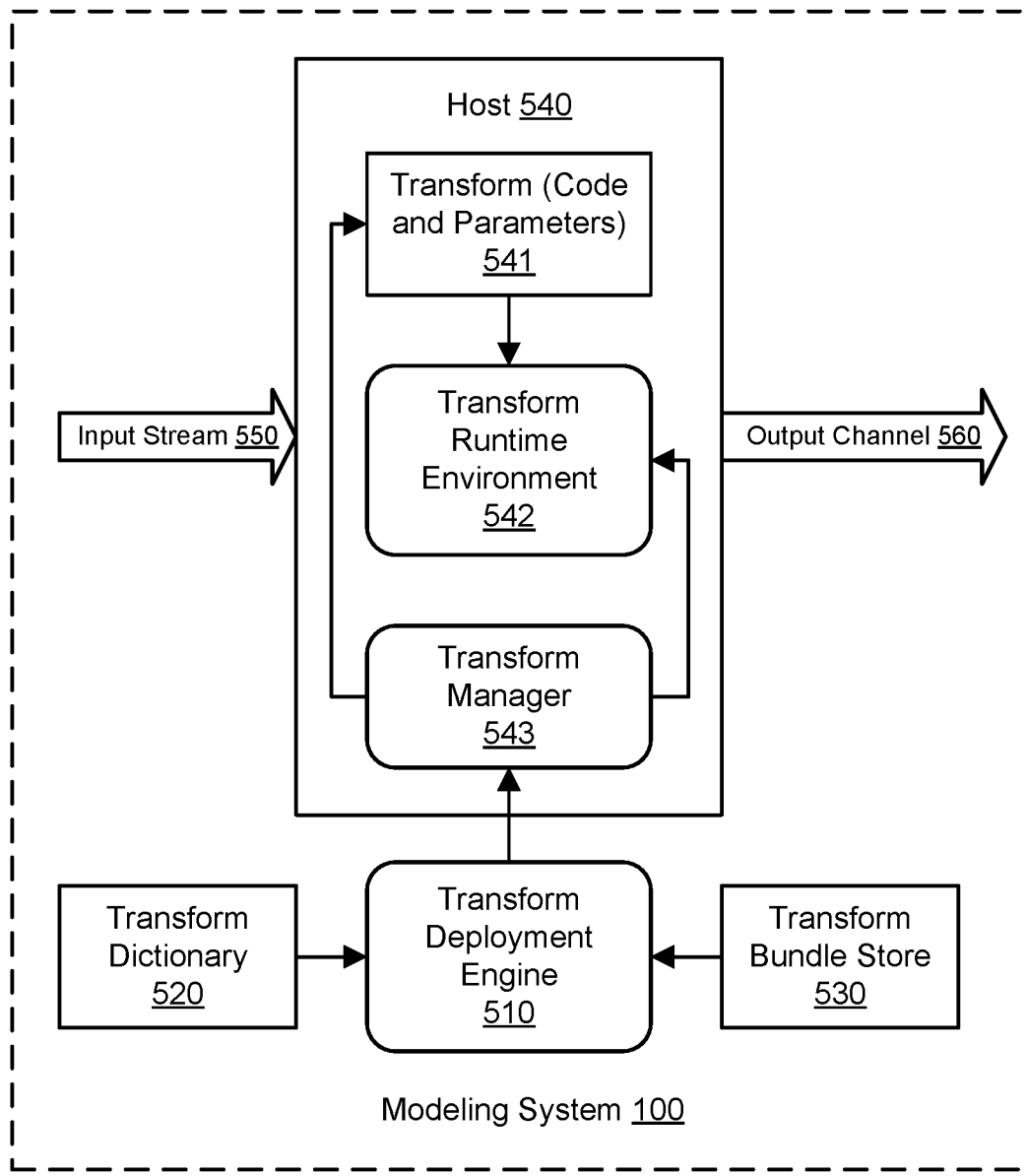
FIG. 5 illustrates further aspects of the example system environment for unified code and data management for machine learning models or software development models, including components usable to deploy and execute transforms, according to one embodiment.

FIG. 5 illustrates further aspects of the example system environment for unified code and data management for machine learning models or software development models, including components usable to deploy and execute transforms, according to one embodiment. In one embodiment, the unification of channel and transform identification, and the further simplification that transform identity is sufficient to track versioning, may significantly reduce the number of discrete entities that need to be tracked. In one embodiment, the modeling system 100 may include the following basic infrastructural components: a dictionary 520 or catalog to track transforms, a bundle store 530 to supply the implementations, and a transform manager or deployment engine 510 to move the transforms into place. In one embodiment, the transform dictionary or transform catalog, given a transform ID, can provide a transform descriptor which describes the semantics of the variable(s) it produces, the transforms on which it depends, and the capabilities of a HTE to which it can be deployed. In one embodiment, the transform catalog may be browsed by users, who may select transforms (or channels) for use in developing their machine learning models or software development models. In one embodiment, the bundle store can provide the bundle that includes the binary code required to execute the transform. In one embodiment, given a transform ID, a transform deployment engine 510 can retrieve the transform bundle from the store 530, retrieve the descriptor from the dictionary 520, and subscribe to (or retrieve) the appropriate upstream transform outputs.

In one embodiment, a transform bundle represents the atomic unit output of a model training system. A transform bundle may include an extension of a code package with additional operational data such as the parameterization to control a model transform. A transform bundle may include sufficient metadata to support forensics, e.g., both to reconstruct the model training environment that produced it and the full corpus used to train it. In one embodiment, a transform bundle represents the compound unit managed by a deployment system. A transform bundle may be constructed from a root transform bundle, along with a specification of additional bundle dependencies required to construct the transform run-time environment (which may be empty if the HTE is not extensible). For some HTEs, the transform bundle may specify some form of glue code for interactivity. As shown in the example of FIG. 5, the transform 541 may be deployed to a host 540 by the transform deployment engine, e.g., using a transform manager 543 resident on the host. The transform 541 may be run in a transform runtime environment 542 on the host, e.g., to transform an input stream 550 into an output channel 560.

The transform bundle store 530 may implement aspects of the repository 120. In one embodiment, the transform repository provides transform bundles on demand. Each bundle may have a transform bundle ID and version, and the repository may manage metadata regarding the capabilities of the transform. The metadata may identify the transform type (e.g., basic vs. model vs. experiment). The metadata may describe the semantics of the output (e.g., a "sum" transform produces a number representing the sum of its input). These semantics may include human-readable descriptions. In one embodiment, the semantics may be expressed in a semantic metalanguage that allows the substrate to process the semantics automatically. The metadata may describe the semantics of the inputs (e.g., a "sum" transform consumes two or more numeric features). The metadata may describe the capabilities of a HTE which is capable of hosting it (e.g., a "sum" transform can be hosted on any compliant environment, but a particular "experiment" transform may require specific capabilities).

In one embodiment, the transform dictionary may describe the results of deploying a transform bundle to production, where the bundle consumes particular input data channels. As described above, each deployed transform may be assigned a globally unique ID. In one embodiment, the data returned by the dictionary may include the transform bundle ID providing the transformation, the identity and version of each input data stream (e.g., specified as the transform ID and version, which can recursively be retrieved), and the semantics of each variable in the output channel of a given transform.

In one embodiment, the modeling system 100 may be used to apply the concepts of dataset transformation to the realm of software development. As discussed above, a transform may add features to (or filter features out of) a feature vector without changing the nature of the vector, e.g., by performing set transformations or mathematical computations. In one embodiment, a transform may consume a data set and transform it into something with an entirely different nature. For example, the act of training a model may essentially consume a set of training data and produce the parameterization for the model; that output may again be transformed to mix in the code dependencies to produce a deployable bundle. While such a process may fit into the paradigm of consuming feature streams to produce a transformed data channel, the output of this type of transformation may represent another transform and not data set per se. Such a transform may be termed a training transform, and the training transform may accept training datasets and produces transform bundles.

For example, a training transform may be used to produce a basic transform. The basic transform may be deployed to one or more HTEs and may then be applied to input data streams to produce derived channels. In one embodiment, the dependency graph of data presented to the training transform can be conceived as existing in a plane, while the basic transform participates in an additional dependency graph, which exists in an orthogonal plane. The two dependency graphs may be related but distinct.

In one embodiment, the development environment itself may be described as a transform, e.g., as a code transform. Like the training environment, the development environment may include custom tools that are not formally part of the transformation (e.g., the specific editor used to mutate code), but the heart of the environment may be a compiler tool that produces the artifacts to be managed. In one embodiment, such tools may be modeled as transforms. In one embodiment, once the development environment is recursively defined as a transform, then the transform manager may be used to deploy and manage its output of transform bundles.

A code transform may produce executable artifacts, collected together into units termed transform bundles, and each new bundle may represent a record emitted into its output channel. A transform bundle may include the set of runtime dependencies needed to operate the bundle, but each of those dependencies is the output of another code transform, and so the dependencies can be considered to describe the streams to be consumed by the runtime. In one embodiment, a transform bundle may thus be a feature vector and represent a time-slice across the derived channels created by the code transforms producing those bundles. In one embodiment, a bundle may logically represent the collection of the most recent records produced by the code transforms on which it depends. In one embodiment, a running instance of software may be described as the head vector of the bundles emitted by the software dependency graph, which can be interpreted as a transform by the host.

In one embodiment, the complex web of systems, services, and other entities that form an enterprise (e.g., using a service-oriented architecture) may be implemented as an interconnected collection of transforms. For example, the "git" code manager may represent a data transform which emits code files, the development environment may represent a code transform which consumes the output of a "git" transform to produce a channel of transform bundles, and the runtime environment may represent a transform that consumes the output of various code transforms to construct a feature vector which can be interpreted as a runnable application. The resulting application may be a transform that consumes various data streams to derive useful features, and each of those data streams may be produced by another transform with the same form.

In one embodiment, the modeling system 100 may be associated with three dependency realms: a data realm, a build realm, and a fabric realm. The data realm may include transform dependency graphs that connect data transforms together to produce the desired output feature vectors and/or datasets. The build realm may connect build transforms together to produce a bundle of built artifacts from the data supplied by a code transform. The fabric realm may create the execution fabric for a transform by moving the "bundles" to appropriate hosts and activating them, where a bundle represents a graph of dependent transforms produced by the build realm. Each realm may be expressed as a connected series of constraints that can be solved by a constraint solver. In one embodiment, within such a well-structured hyperverse, the entire system may be articulated using dependencies in a unified, coherent declarative language. The various realms may be interdependent but separate, and the dependency graphs may be independent.

In one embodiment, regarding the data realm, each node in the transform graph may be considered as an unfulfilled constraint that a constraint solver can resolve by deploying transforms to the appropriate transform hosts and wiring the outputs together. For example, if a system wants to backfill a new channel, then the system may obtain the channel definition from the transform dictionary, deploy the right transform versions, and replay the input event channels. In one embodiment, regarding the build realm, a particular version of a transform bundle may represent a constraint for a builder transform. In one embodiment, a bundle that is not pre-built may be reconstructed by declaring a need for the output of a build transform (resulting in its deployment), having the appropriate code transform output applied to it, and the reproduction of the needed bundle. In one embodiment, the bundle store may represent a cache that can hold recently produced bundles, where bundles can be rebuilt them as needed if they have been evicted. In one embodiment, in the build realm, the distinction between a major and minor change may be meaningful. In one embodiment, the data realm might leverage two different versions of the same transform (e.g., for a system that has two machine learning models, one of which that has been retrained with the more recent version and the other that has not). In one embodiment, such use of the same transform may be impermissible in the build realm, where software in the same operational environment may be expected to use the same version of a library.

In one embodiment, regarding the fabric realm, the act of deploying a transform may be considered a form of constraint solving. When operation of a transform is desired, the constraint solver may resolve the appropriate collection of artifacts into a bundle and move them (along with associated operational data) into a hosting environment capable of running them. In one embodiment, after moving the data to the right location, the solver may signal the transform host to "activate" the transform and perform the required work. In one embodiment, both a fabric (or environment) solver and a dataplane solver may be used as constraint solvers. The dataplane solver may be responsible for resolving the dependency graph and identifying the necessary transforms to produce a desired output, and the fabric solver may be responsible for selecting and installing the corresponding transform bundles for operation. In one embodiment, the fabric solver, given the demand to operate a transform bundle, may operate in two phases. For a transform bundle B that requires capabilities [$C_1$, $C_2$, . . . ], each host in the fabric may provide and declare a set of hosting capabilities [$HC_1$, $HC_2$, . . . ] that it provides. A first phase of the solution may include selecting the hosting environment which best matches the required capabilities, creating a candidate set of hosts which are capable of hosting the bundle, and selecting the most suitable host from that candidate set. Using this approach, the solver may consider the candidate set as a fixed pool of resources across which it might want to do some optimization and forecasting while deciding which host to use to fill the constraints. In a second phase, the bundle may be moved to the selected host and activated.

In one embodiment, the input to the dataplane solver may represent a demand for output $O(t_{start}, t_{end})$ (where the optional arguments $t_{start}$ and $t_{end}$ represent time-slices; if both are omitted, $t_{start}$ can be assumed to be "now," resulting in the head vector). By consulting the dictionary, the solver may recognize that 00 is defined by transform $T_0$ and depends on transforms [$T_1$, $T_2$, . . . ].In one embodiment, the solver may include a dependency resolver that builds the fully specified closure across the graph and then invokes the fabric solver to deploy it.

In various embodiments, the modeling system 100 may support a variety of execution environments for transforms. The variety of environments may permit optimization for different constraints such as speed, performance, cost minimization, and so on. In various embodiments, a heterogeneous HTE substrate may support function-execution services, containerization, and other hosting environments. In one embodiment, using a machine interpretable metalanguage for describing the semantics of a channel, dependencies may be declared based on the semantics of the required data, and the solver may then choose the best collection of channels to satisfy those needs. In various embodiments, the modeling system 100 may support multiple variants of the same stream, potentially optimized for different access patterns, and may extend the semantic metalanguage to describe the performance characteristics. For example, different variants may cache the most recent version of each record in a stream, thereby allowing operations on a single entity without the risk of scanning the entire stream. As another example, channels may represent statistical meta-analysis of the stream, e.g., to capture the cardinality of the stream or the freshness (the elapsed time between raw data injection and current cascaded processing). In one embodiment, the constraint solver may perform the equivalent of query optimization for stream processing.

In one embodiment, to perform validation, an evaluation transform may be deployed to consume and analyze the new data channel to declare whether or not it is acceptable. The validation transform may then consume the output of the evaluation transform along with the dependency graph and emit an updated dependency graph appropriately if the validation is successful. Doing so may create a new input to the data constraint solver and result in the new version of the transform being activated.

Figure 6:
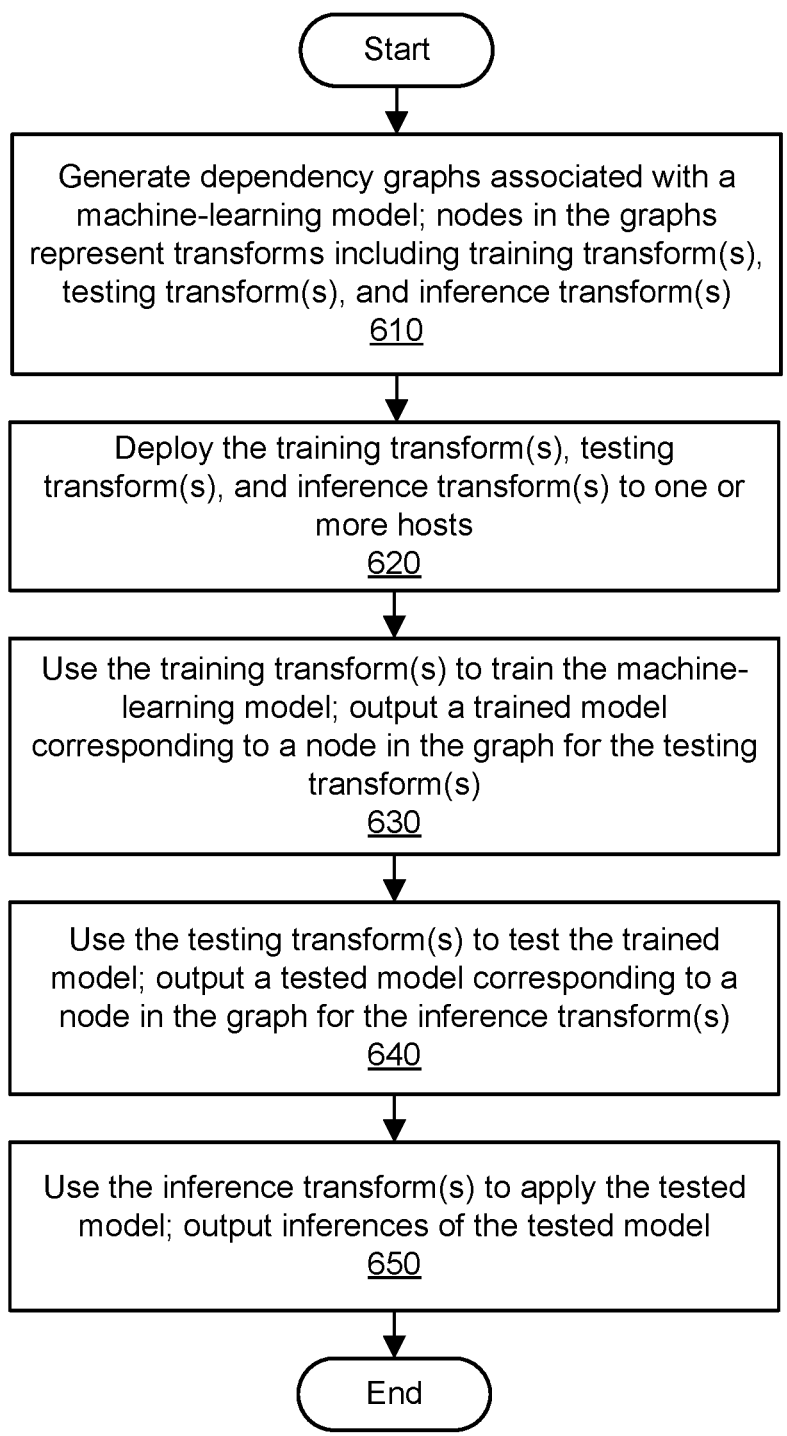
FIG. 6 is a flowchart illustrating a method for unified code and data management for machine learning models or software development models, according to one embodiment.

FIG. 6 is a flowchart illustrating a method for unified code and data management for machine learning models or software development models, according to one embodiment. As shown in 610, dependency graphs may be generated. A dependency graph may describe relationships between components or stages of a machine learning model. The dependency graphs may include nodes for various stages such as training of the model, testing of the trained model, and application of the tested model in a production environment. For example, the dependency graphs may include nodes representing one or more training transforms, one or more testing transforms, and one or more inference transforms. As a further example, the graphs may include a first graph usable for producing a trained model, a second graph that consumes the output of the first graph and is usable for producing a tested model, and a third graph that consumes the output of the second graph and is usable for generating inferences. Each node may represent a transform that consumes a stream of data and generates another stream. As shown in 620, the training transform(s), testing transform(s), and inference transform(s) may be deployed to one or more hosts. The host(s) may be part of one or more Hosted Transformer Environments (HTEs).

As shown in 630, the training transform(s) may be used to train the machine learning model. The model may be trained using input data from one or more data sources. In one embodiment, the input data may be provided to the training transform by one or more data transforms that acquire (and potentially process) the data. The training transform(s) may produce a trained model as output of the first dependency graph. The trained model may be provided to one or more downstream nodes using a stream or channel. The trained model may correspond to a node in another dependency graph, e.g., to provide input to a testing stage represented by the second dependency graph.

As shown in 640, the testing transform(s) may be used to test the trained machine learning model. The model may be tested in a test environment using test data from one or more data sources. The testing transform(s) may produce a tested model as output of the second dependency graph. The tested model may be provided to one or more downstream nodes using a stream or channel. The tested model may correspond to a node in another dependency graph, e.g., to provide input to an inference stage represented by the third dependency graph.

As shown in 650, the inference transform(s) may be used to apply the tested model to live data. The model may be applied in a production environment using real-world data, e.g., data that describes the state of the world in some way, such as user data acquired in an online marketplace of goods and services. The real-world data may be acquired from one or more data sources. The inference transform(s) may produce one or more inferences as output. The inferences may be provided to one or more consumers using a stream or channel.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multi-processor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement a machine learning modeling system, wherein the machine learning modeling system is configured to:
   generate and store a machine learning model that comprises a plurality of dependency graphs respectively corresponding to a training stage, a testing stage and an inference stage of a lifecycle of the machine learning model, wherein the plurality of dependency graphs comprise a plurality of nodes representing transforms comprising training transforms of the training stage, testing transforms of the testing stage, and inference transforms of the inference stage;
   use the training transforms of the training stage to train the machine learning model using input data, wherein the training transforms output a trained model corresponding to a node in the model's testing stage dependency graph for the testing transforms;
   use the testing transforms of the testing stage to test the trained model, wherein the testing transforms output a tested model corresponding to a node in the model's inference stage dependency graph for the inference transforms; and
   use the inference transforms of the inference stage to apply the tested model, wherein the inference transforms output one or more inferences of the tested model.

2. The system as recited in claim 1, wherein the machine learning modeling system is further configured to access the plurality of dependency graphs to:
   use the training transforms to train an additional version of the machine learning model using the input data and one or more modified parameters, wherein the training transforms output an additional trained model corresponding to the node in the dependency graph for the testing transforms;
   use the testing transforms to test the additional trained model, wherein the testing transforms output an additional tested model corresponding to the node in the dependency graph for the inference transforms; and
   use the inference transforms to apply the additional tested model, wherein the inference transforms output one or more inferences of the additional tested model.

3. The system as recited in claim 1, wherein a stream comprising the trained model is identified using identifiers of the training transforms and one or more data sources associated with the input data, wherein a stream comprising the tested model is identified using identifiers of the testing transforms and the training transforms, and wherein a stream comprising the one or more inferences is identified using identifiers of the inference transforms and the testing transforms.

4. The system as recited in claim 1, wherein a stream comprising the trained model is associated with a first version identifier, and wherein the machine learning modeling system is further configured to:
   generate modified training transforms; and
   access the plurality of dependency graphs to:
   use the modified training transforms to output a stream comprising a modified trained model, wherein the stream comprising the modified trained model is associated with a second version identifier; and
   validate the modified trained model at a consumer of the stream.

5. A computer-implemented method, comprising:
   generating a plurality of dependency graphs comprising a first dependency graph of a first stage of a software development model, a second dependency graph of a second stage of the software development model and a third dependency graph of a third stage of the software development model, wherein the plurality of dependency graphs comprise a plurality of nodes representing transforms;
   performing the software development model, comprising:
   accessing the plurality of dependency graphs;
   performing the first stage of the software development model, comprising using one or more transforms of the first dependency graph to generate a first output corresponding to a node in the second dependency graph;
   performing the second stage of the software development model, comprising using one or more transforms of the second dependency graph to generate a second output based at least in part on the first output; and
   performing the third stage of the software development model, comprising using one or more transforms of the third dependency graph to generate a third output based at least in part on the second output.

6. The method as recited in claim 5, wherein the first output is generated based at least in part on first input, and wherein the method further comprises accessing the plurality of dependency graphs to perform:
   using the one or more transforms of the first dependency graph to generate a modified version of the first output based at least in part on the first input; and
   using the one or more transforms of the second dependency graph to generate a modified version of the second output based at least in part on the modified version of the first output.

7. The method as recited in claim 5, wherein a first stream comprising the first output is identified using identifiers of the one or more transforms of the first dependency graph and one or more sources of input data to the first dependency graph, and wherein a second stream comprising the second output is identified using identifiers of the one or more transforms of the first dependency graph and identifiers of the one or more transforms of the second dependency graph.

8. The method as recited in claim 5, wherein a stream comprising the first output is associated with a first version identifier, and wherein the method further comprises accessing the plurality of dependency graphs to perform:
   using the one or more transforms of the first dependency graph to generate a modified version of the first output, and wherein a stream comprising the modified version of the first output is associated with a second version identifier; and validating the modified version of the first output using the one or more transforms of the second dependency graph.

9. The method as recited in claim 8, wherein the modified version of the first output is validated based at least in part on detection of the second version identifier at the one or more transforms of the second dependency graph, and wherein the modified version of the first output is validated prior to using the modified version of the first output to generate a modified version of the second output.

10. The method as recited in claim 5, wherein the one or more transforms of the first dependency graph comprise a first set of program code and parameters, and wherein the one or more transforms of the first second dependency graph comprise a second set of program code and parameters.

11. The method as recited in claim 5, wherein the transforms are described and selectable in a transform catalog, and wherein the transform catalog is accessible to a plurality of users.

12. The method as recited in claim 5, wherein the first dependency graph represents a transform that consumes first input and generates the first output, wherein the second dependency graph represents a transform that consumes the first output and generates the second output and wherein the third dependency graph represents a transform that consumes the second output and generates the third output.

13. A computer-readable storage medium storing program instructions computer-executable to perform:

generating a plurality of dependency graphs comprising a first dependency graph of a first stage of a software development model, a dependency graph of a second stage of the software development model and a third dependency graph of a third stage of the software development model, wherein the plurality of dependency graphs comprise a plurality of nodes representing transforms;

performing the software development model, comprising:
  performing the first stage of the software development model, comprising using one or more transforms of the first dependency graph to generate a first output corresponding to a node in the second dependency graph;
  performing the second stage of the software development model, comprising using one or more transforms of the second dependency graph to generate a second output based at least in part on the first output; and
  performing the third stage of the software development model, comprising using one or more transforms of the third dependency graph to generate a third output based at least in part on the second output.

14. The computer-readable storage medium as recited in claim 13, wherein the first output comprises a trained model, wherein the second output comprises a tested model and wherein the third output comprises inferences based at least in part on application of the tested model.

15. The computer-readable storage medium as recited in claim 13, wherein a first stream comprising the first output is identified using identifiers of the one or more transforms of the first dependency graph and one or more sources of input data to the first dependency graph, and wherein a second stream comprising the second output is identified using identifiers of the one or more transforms of the first dependency graph and identifiers of the one or more transforms of the second dependency graph.

16. The computer-readable storage medium as recited in claim 13, wherein a stream comprising the first output is associated with a first version identifier, and wherein the program instructions are further computer-executable to perform accessing the plurality of dependency graphs to perform:

using the one or more transforms of the first dependency graph to generate a modified version of the first output, and wherein a stream comprising the modified version of the first output is associated with a second version identifier; and validating the modified version of the first output using the one or more transforms of the second dependency graph.

17. The computer-readable storage medium as recited in claim 16, wherein the modified version of the first output is validated based at least in part on detection of the second version identifier at the one or more transforms of the second dependency graph, and wherein the modified version of the first output is validated prior to using the modified version of the first output to generate a modified version of the second output.

18. The computer-readable storage medium as recited in claim 16, wherein the first output is generated in parallel with the modified version of the first output, wherein the first version identifier is used to assess costs to one or more consumers of the first output, and wherein the second version identifier is used to assess costs to one or more consumers of the modified version of the first output.

19. The computer-readable storage medium as recited in claim 13, wherein the one or more transforms of the first dependency graph comprise a first set of program code and parameters, and wherein the one or more transforms of the second dependency graph comprise a second set of program code and parameters.

20. The computer-readable storage medium as recited in claim 13, wherein the transforms are described and selectable in a transform catalog, and wherein the transform catalog is accessible to a plurality of users.

\* \* \* \* \*